(12) United States Patent
Cochet et al.

(10) Patent No.: US 10,275,878 B2
(45) Date of Patent: Apr. 30, 2019

(54) METHOD FOR THE QUANTIFICATION OF THE PRESENCE OF FATS IN A REGION OF THE HEART

(71) Applicants: UNIVERSITE DE BORDEAUX, Bordeaux (FR); INSTITUT NATIONAL DE LA SANTÉ ET DE LA RECHERCHE MÉDICALE, Paris (FR); CENTRE HOSPITALIER UNIVERSITAIRE DE BORDEAUX, Talence (FR)

(72) Inventors: Hubert Cochet, Bordeaux (FR); Pierre Jais, St Médard en Jalles (FR)

(73) Assignees: UNIVERSITE DE BORDEAUX, Bordeaux (FR); INSTITUT NATIONAL DE LA SANTÉ ET DE LA RECHERCHE MÉDICALE, Paris (FR); CENTRE HOSPITALIER UNIVERSITAIRE DE BORDEAUX, Talence (FR)

( * ) Notice: Subject to any disclaimer, the term of this patent is extended or adjusted under 35 U.S.C. 154(b) by 74 days.

(21) Appl. No.: 15/307,643

(22) PCT Filed: Apr. 29, 2015

(86) PCT No.: PCT/EP2015/059362
§ 371 (c)(1),
(2) Date: Oct. 28, 2016

(87) PCT Pub. No.: WO2015/165978
PCT Pub. Date: Nov. 5, 2015

(65) Prior Publication Data
US 2017/0061617 A1    Mar. 2, 2017

(30) Foreign Application Priority Data
Apr. 30, 2014  (FR) .................. 14 53941

(51) Int. Cl.
  *G06T 7/00*    (2017.01)
  *G06T 7/11*    (2017.01)
  *G06T 7/187*   (2017.01)

(52) U.S. Cl.
  CPC .......... *G06T 7/0012* (2013.01); *G06T 7/11* (2017.01); *G06T 7/187* (2017.01);
  (Continued)

(58) Field of Classification Search
  CPC ......... G06T 7/0012; G06T 7/11; G06T 7/187; G06T 2207/10012; G06T 2207/10081;
  (Continued)

(56) References Cited

U.S. PATENT DOCUMENTS

| 4,722,095 A | * | 1/1988 | Muegge | G01N 15/088 250/252.1 |
| 5,222,021 A | * | 6/1993 | Feldman | A61B 6/583 378/18 |

(Continued)

OTHER PUBLICATIONS

Tsai et al., , "Left ventricular myocardium segmentation on delayed phase of multi-detector row computed tomography", Int J CARS (2012) 7:737-751.*

(Continued)

*Primary Examiner* — Mekonen T Bekele
(74) *Attorney, Agent, or Firm* — Pillsbury Winthrop Shaw Pittman LLP

(57) ABSTRACT

A method for quantifying the presence of fats in a region of the heart includes an acquisition of an image of at least one cavity of the heart and of a wall; a selection of at least one pixel of a section through the heart including a density of pixels included in a first range of values; a growth in the selection of at least one pixel so as to define an extended 3D zone delimited by the cavity; an operation of homogeneous dilation of the extended 3D zone making it possible to define a dilated volume; an operation of extracting a peripheral (Continued)

region arising from the subtraction between the dilated volume and the extended 3D zone; a quantification of the number of pixels of a second range of values within the peripheral region.

18 Claims, 7 Drawing Sheets

(52) U.S. Cl.
CPC ............ *G06T 2207/10012* (2013.01); *G06T 2207/10081* (2013.01); *G06T 2207/20096* (2013.01); *G06T 2207/20101* (2013.01); *G06T 2207/20104* (2013.01); *G06T 2207/30048* (2013.01)

(58) Field of Classification Search
CPC . G06T 2207/20096; G06T 2207/20101; G06T 2207/20104; G06T 2207/30048
See application file for complete search history.

(56) References Cited

U.S. PATENT DOCUMENTS

| | | | |
|---|---|---|---|
| 6,058,218 A | 5/2000 | Cline | |
| 6,990,222 B2* | 1/2006 | Arnold | A61B 5/02007 378/18 |
| 9,830,698 B2* | 11/2017 | Wang | G06T 7/0012 |
| 2003/0095695 A1* | 5/2003 | Arnold | A61B 5/02007 382/131 |
| 2005/0281447 A1* | 12/2005 | Moreau-Gobard | G06T 7/12 382/130 |
| 2008/0075343 A1 | 3/2008 | John et al. | |
| 2008/0107229 A1* | 5/2008 | Thomas | A61B 6/032 378/4 |
| 2008/0221445 A1* | 9/2008 | Rollins | G01N 21/4795 600/428 |
| 2008/0273780 A1* | 11/2008 | Kohlmyer | A61B 6/032 382/131 |
| 2008/0292169 A1* | 11/2008 | Wang | G06T 7/0012 382/131 |
| 2012/0310074 A1* | 12/2012 | Yamamori | A61B 6/503 600/407 |

OTHER PUBLICATIONS

International Search Report as issued in International Patent Application No. PCT/EP2015/059362, dated Jul. 24, 2015.

Mühlenbruch, G., et al., "Global left ventricular function in cardiac CT, Evaluation of an Automated 3D region-growing segmentation algorithm," European Radiology, vol. 16, No. 5, May 2006, XP019336328, pp. 1117-1123.

Tsai, I,-C., et al., "Left ventricular myocardium segmentation on delayed phase of multi-detector row computer tomography," International Journal of Computer Assisted Radiology and Surgery; A Journal for Interdisciplinary Research, Development, and Applications of Image Guided Diagnosis and Therapy, vol. 7, No. 5, Apr. 2012, XP035108793, pp. 737-751.

Tsai, I.-C., et al., "Left ventricular myocardium segmentation on arterial phase of multi-detector row computed tomography," Computerized Medical Imaging and Graphics, vol. 36, No. 1, Mar. 2011, XP028340976, pp. 25-37.

Williams, T.J., et al., "Cardiomyopathy: appearances on ECG-gated 64-detector row computed tomography," Clinical Radiology, vol. 63, No. 4, Nov. 2007, XP022509945, pp. 464-474.

* cited by examiner

METHOD FOR THE QUANTIFICATION OF THE PRESENCE OF FATS IN A REGION OF THE HEART

CROSS REFERENCE TO RELATED APPLICATIONS

This application is the U.S. National Stage of PCT/EP2015/059362, filed Apr. 29, 2015, which in turn claims priority to French Patent Application No. 1453941 filed Apr. 30, 2014, the entire contents of all applications are incorporated herein by reference in their entireties.

DOMAIN

The domain of the invention involves methods to quantify the presence of fibro-adipose tissue in a heart region, specifically in the thickness of the myocardial wall. The invention method also involves the systems to permit processing of digital images obtained by scanner and permitting operations to manage such quantification and besides, to generate a mapping of the regions comprising the fibro-adipose masses.

STATE OF THE ART

The present imaging processes allows visually evaluating starting from images coming from scanner acquisitions or MRI the presence of fibro-adipose tissue in the region of the heart specifically the surface of the myocardial wall of the right ventricle. On the other hand, the current processes do not permit obtaining a quantification of the fibro-adipose masses and a mapping of the distribution of these masses on the surface of the heart wall and within the thickness of the wall.

SUMMARY OF THE INVENTION

The invention aims to mitigate the aforementioned drawbacks.

One goal of the invention involves a method for quantification of the presence of fats in a region of the heart. The method includes:
- an acquisition of a three-dimensional image of at least one heart cavity and a wall delimiting the aforesaid cavity;
- a selection of at least one pixel of the cavity defining a grain;
- a growth of the grain step by step from nearby pixels until encountering a pixel zone with a density less than a predefined threshold, the growth of the grain achieving the definition of an extended delimited zone where the density of the pixels are included in a first range of values, the 3D image obtained from the growth is called "3D extended zone";
- an expansion operation of the extended 3D zone permits the definition of an expanded volume containing at least a part of the thickness of the cavity wall considered;
- an extraction operation of a peripheral region coming from the subtraction of the volume of the extended 3D zone from the expanded volume and;
- a quantification of the number of pixels in a second range of values from the extracted peripheral region.

One advantage of such a method is to quantify a proportion of fatty masses in the wall to perform some of the analyses. Also the mapping of the heart wall is possible. This method finds numerous applications specifically in the guidance of a heart intervention, in the identification of the type of muscular wall of a patient's heart, in the prognosis of a heart behavior or in the diagnosis of a heart pathology. Finally, this method permits modelling some specific heart densities in order to establish statistics on a given population for example to establish a universal reference data set.

According to one mode of embodiment, the acquisition of a three-dimensional image of the heart is achieved by means of a scanner, the density of the pixels of the image being expressed in the Hounsfield unit.

According to one mode of embodiment, the method for quantification of presence of fats in a region of the heart includes:
- a definition of at least one border of the three-dimensional image of the heart cavity considered;
- the growth of the grain taking place until encountering at least one border or a zone of a pixel density less than the predefined threshold.

According to one mode of embodiment, the border permits separating the part of the image acquired containing the cavity considered from an orifice in the aforesaid cavity where the density of pixels is considered in the first range of values.

One advantage of the definition of boundary(ies), for example forming a plane, is that it permits limiting the growth zone to a given volume. From this fact, the definition of boundary(ies) forming some planes permits limiting the calculations at the time of the growth operation to the region extending into an orifice. Thus, the density of the pixels close to the orifice or in the orifice is not compared to a predefined threshold, which limits the calculation operations. Effectively, the region spreading into the orifices of the cavity, acquired at the same time as the image, does not include the wall in which it is desired to calculate pixels densities in the second range of values for example corresponding to fatty masses.

According to one mode of embodiment, the growth of the grain takes place in three dimensions from a selection of pixels on a cross-sectional plane of the cavity.

According to one mode of embodiment, the growth of the grain takes place in two dimensions on each cross-sectional plane of the cavity, the "3D extended zone" is reconstituted from the set of "extended 2D zones."

One advantage of the growth operation from an automatic or manual selection of pixels in the cavity is that it permits quickly obtaining the 3D contour of the cavity. One advantage of proceeding in this manner is to benefit from a homogeneity of the pixel density of the cavity 25 to facilitate the step by step growth. Effectively, such a growth operation made from a selection of wall pixels would be more difficult to achieve since potentially the wall may consist of a great disparity of pixel densities. Such an operation would potentially lead to mistakes in outlining the wall region formed considering for example the presence of fat with a different pixel density that the invention method seeks precisely to isolate.

According to one mode of embodiment, the predefined threshold is defined with regard to a density determination of calculated reference pixels from a measurement in the acquired image, the aforesaid acquired image contains the cavity and at least one of the walls of the aforesaid cavity.

According to one mode of embodiment, the reference density is calculated from a measurement made on the cavity pixels, the reference density corresponds to a lower limit of the first range of pixel density values.

According to one mode of embodiment, the reference density is calculated from a measurement made on wall pixels defining a region of interest, the reference density corresponds to an upper limit of a third range of pixel density values of the region of interest.

According to one mode of embodiment, the reference pixels density is calculated in a band of values situated between the first range of values and the third range of values in order to best differentiate the allocation of a pixel to one these ranges of values.

According to one mode of embodiment, the measurement of the reference density is chosen among a predefined value corresponding to a typical heart profile.

One advantage of a reference density calculation is to permit an extension of the grain up to the internal limit of the cavity, called endocardium, without "encroaching" on pixels of the wall. This solution permits isolating the whole wall region on considering the pixels having a certain pixel density. From this fact the measurements on the wall have a good precision and take into account the entire thickness of the wall. Finally, it permits a simple operation of one by one comparison of a pixel density at the time of the growth operation while ascertaining a good discrimination between the wall pixels and those of the cavity.

According to one mode of embodiment, the expansion operation is iterated multiple times in order to generate a multitude of 3D expanded images, the successive expansions being determined so that every new expanded 3D image contains the previous expanded 3D image.

According to one mode of embodiment, one 3D layer of a peripheral region of the extended 3D image is extracted by subtraction of a N-1 th expanded image from the N th 3D expanded image of the 3D extended image.

One advantage of this layer by layer extraction solution is to achieve a fine sectioning of the wall to isolate some pixel densities of a layer. The treatment layer by layer of the wall permits a better segmentation of the region defining the wall, specifically to delimit the enumeration operation of the pixels of a given density of the epicardium without exceeding it.

According to one mode of embodiment, a quantification operation consists of the enumeration of the number of pixels of a density included in the second range of values in an extracted 3D layer or a peripheral 3D region.

One advantage of this operation is to allow calculating the proportion of certain density of pixels corresponding for example to fatty masses. Effectively, the regions presenting fatty masses in the wall may be isolated by calculating the density of pixels in a certain range of values in the wall.

It is possible because the pixel densities from the fat includes values different from the pixel densities of the muscle.

According to one mode of embodiment, one operation of thresholding the pixel densities of the peripheral 3D region consists of a distribution according to a multiple ranges of values of different proportions of pixel densities.

According to one mode of embodiment, one 3D mapping generation of the cavity wall includes the representation of the pixels of a density included in the second range of values with a predefined colorimetric coding.

One advantage of this mode of embodiment is to allow an operator to visualize the heart wall for example to prepare an intervention.

According to one mode of embodiment, a 3D mapping generation of the cavity wall includes a subdivision of the second range of values into multiple sub-ranges of values corresponding to different proportions of pixel densities with a predefined colormetric coding assigned to every subdivision.

One advantage of this mode of embodiment is to permit displaying different regions of the wall with different colors on a screen according to the fat level present in the regions. The use of a segmented colormetric coding permits a better assessment of the zones impacted by the presence of fats.

Advantageously, the expansion operation consists of a uniform wall extension of the three-dimensional volume of the 3D zone. This extension may be defined preferentially over a distance between 1 mm and 12 mm. A value of 3 mm is especially advantageous to quantify the presences of fats in the wall of the right ventricle.

Advantageously, the reference density is determined from a selection of pixels in a wall separating the right ventricle from the left ventricle.

According to one example of embodiment, the first range of values is included between 200 and 400 HU. The third range of values is included between −100 and 100 HU. The second range of values is included between 30 and 10 HU.

Advantageously, when different expansions are configured to obtain multiple 3D images, every new expanded 3D image consists of a uniform layer of a thickness of at least one more pixel than the previous expanded 3D image.

Advantageously, according to one example of embodiment, the heart cavity, is the right ventricle and the valvular planes are the tricuspid and pulmonary planes.

Advantageously, the boundary-marks of the second range of values are defined to identify fatty masses in the wall.

Another object of the invention concerns a system for the display of an imaging of an organ permitting the display of fatty masses, implementing the invention method. The system of the invention includes:

a display permitting:
visualizing a cross-section of a three-dimensional image acquired by a scanner;
to visualize a three-dimensional image of the mapping generated by the invention method;
a selector of:
at least one pixel to define a reference density and;
at least one pixel to generate a 3D extended zone obtained by step by step growth;
a tool permitting to draw a line defining at least one valvular plane;
an interface:
permitting to parameterize the expansion distance d or an expansion proportion;
to extract a three-dimensional excess thickness from the volume originating from the 3D extended zone and the 3D expanded zone;
the means of calculations permitting:
to enumerate the number of pixels of the three-dimensional excess thickness having a density included in a predefined value interval;
to handle all calculations allowing processing of the 3D image operations among which specifically the operations of expansion, of extension, of extraction.

BRIEF DESCRIPTION OF THE FIGURES

Other features and advantages of the invention will be emphasized by reading the detailed description that follows, in reference to the attached figures, that illustrate.

Figure 5:
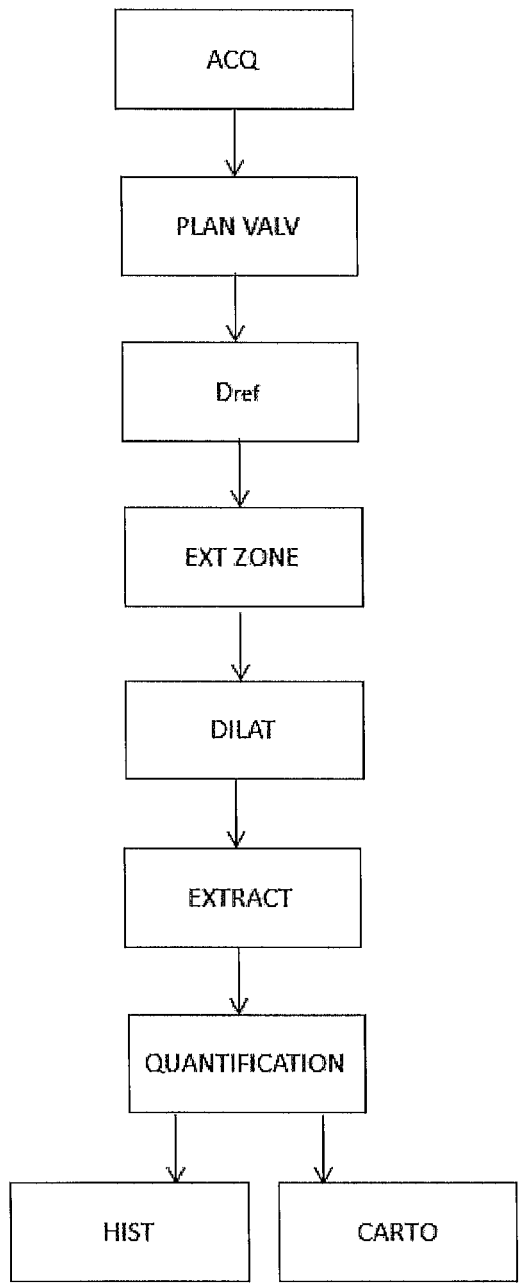

4B: an example band of values in which the reference pixels density may be calculated;

FIG. 5: the main stages of the invention method.

DESCRIPTION

Figure 1:
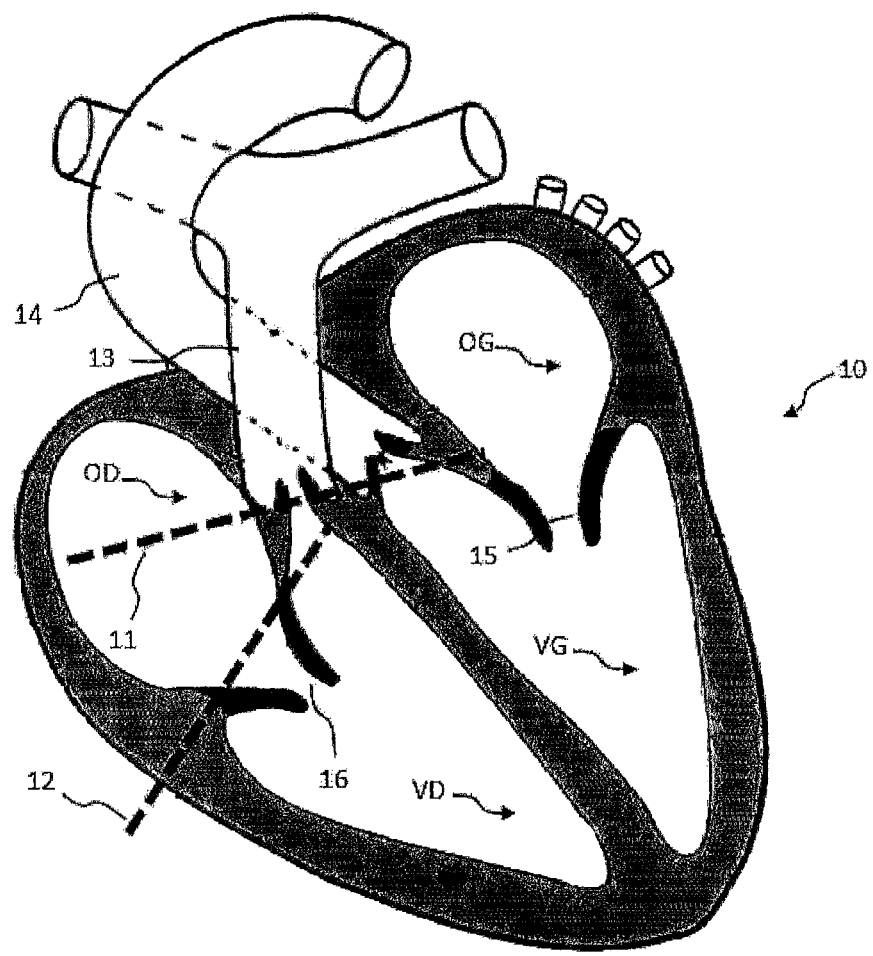
FIG. 1: a view of a heart and regions forming the cavities and walls.

FIG. 1 represents a human heart 10. Represented on FIG. 1, within the heart 10: Are a left ventricle, noted VG, a right ventricle, noted as VD, a right auricle, noted as OD, and a left auricle, noted as OG.

In the following description, we call "cavity" a circulating blood volume 30 contained in the heart and limited by the cardiac walls. 4 cavities exist in the heart: a left ventricle VG, a right ventricle VD, a right auricle OD and a left auricle OG.

The cavities receive a blood flow that travels between the different arteries, veins and valves connecting volumes between them. By way of example, the tricuspid valve 16 is represented between the right ventricle VD and the right auricle OD, the mitral valve 15 is also represented between the left auricle OG and the left ventricle VG. Besides, the aorta 14 is represented entering into the left ventricle VG and the pulmonary artery 13 is represented entering the right ventricle VD.

In order to understand better the description that follows, the valvular, aortic or venous orifices either entering or leaving every blood volume circulating in the heart are named "orifices."

The invention method consists of a stage including the acquisition of a 3D image of the heart or a heart region. Preferentially, the image acquired includes at least one cavity such as the right ventricle VD or the left ventricle VG or one of the OD, OG auricles as well as the wall surrounding the aforesaid cavity. This wall consists of a muscle named myocardium, and extends from an internal limit named "endocardium" up to an external limit named "epicardium."

Figure 2A:
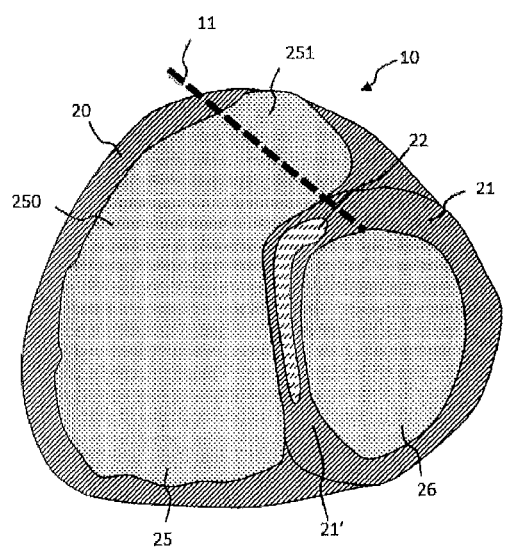
FIG. 2A: a cross-section of a three-dimensional image of the heart acquired by a scanner with the definition of a valvular plane according to the invention method.
Figure 2B:
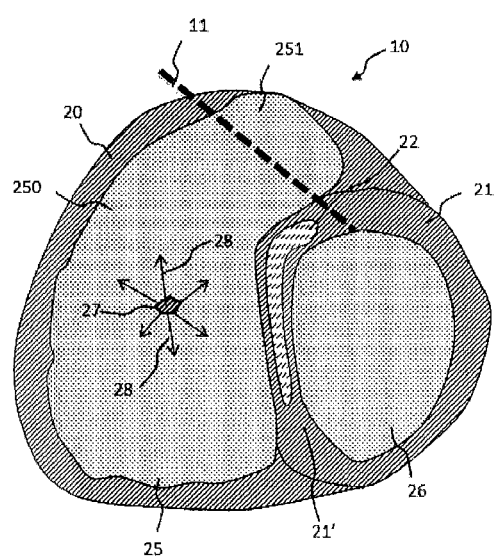
FIG. 2B: a selection of a zone that will be extended according to the invention method in a 2D or 3D region of the image obtained of a cardiac cavity, here representing the right ventricle.

FIG. 2A represents a cross-sectional view of a 3D image of a heart acquired by means of a scanner. Different zones appear namely:
  a zone 25 delimiting the cavity of the right ventricle VD;
  a zone 20 delimiting the wall of the right ventricle VD;
  a zone 26 delimiting the cavity of the left ventricle VG;
  a zone 21 delimiting the wall of the left ventricle VG;
  a zone 21' delimiting the wall situated between the two ventricles left and right, called the septum.

The walls 20, 21 and 21' are an unique muscular wall surrounding the different cavities. The different notations 20, 21 and 21' permit differentiating a zone of the wall 21' situated between two cavities, such as for example the VD and VG, of a wall 20 or 21 separating a cavity of another organ or the medium in which the heart is present.

The zones represented in 2 dimensions delimiting regions of a cross-sectional image come from image zones acquired in 3 dimensions. So as an example the 3D zone is noted: the three-dimensional zone reconstituted from the set of the 2D zones from each cross-sectional plane. So zone 25 will be designated indifferently:
  a 2D zone designating the cross-section of a 3D image of the right ventricle VD that is represented in FIG. 2A;
  a 3D zone designating the volume of the 3D image of the right ventricle VD coming from the set of images from the 2D cross-sections of the aforesaid zone.

The invention method consists therefore of the acquisition of a 3D image preferentially obtained by scanner. This acquisition stage is marked ACQ on FIG. 5. The processing of the acquisition image samples the tomodensitometry also named "scanography." These techniques are also identified as the CT-Scan or the Cat-Scan and rely on the measurement of the X-ray absorption by the tissues of an organ. The digitization of the images permits reconstructing the 2D and 3D image of the anatomical structures of the region observed.

The computer assigns to every image pixel a gray scale value proportional to the attenuation of the X-rays by the corresponding body volume. The measured parameter is an attenuation coefficient commonly named "density". This density is specific to the imaged tissue. It is expressed in Hounsfield units (HU) and is distributed on an active scale from −1000 HU for air to +1000 HU for the dense cortical bone, while passing through −50 HU for the adipose tissue and 0 for water. Within the heart, the scanner density obtained differs between the wall and the cavity. Within the wall, the fibro-adipose densities are different from the normal muscular densities. The digital 3D image can be acquired and be stored by a computer that consists of the means of calculations and a screen permitting the display of the 3D generated image.

The 3D image generated includes a volumetric distribution of pixels where the pixel density can be measured specifically by selecting a given pixel or a given zone. It is for example possible to calculate the mean and the dispersion of the density values, that it to say the standard deviation, within a group of pixels selected in the imaging plane or volume. Such a pixel selection is named a "region of interest."

The invention method consists of a stage permitting the definition of at least one plane defining at least one processing border of the 3D images considered in the subsequent processing stages. This or these plane(s) are called one or of the valvular plane(s) in the description continuation. This stage is noted as PLAN VALV on FIG. 5.

A valvular plane permits defining a closed cavity from the point of view of the continuity of the circulating blood flow in the circulating blood volume defining the cavity.

According to the cavities considered, different entry and exit sites are present in order to permit a continuity of the circulating blood flow. On FIG. 1, the entry and exit sites are noted of the heart cavities as follows:
  OD cavity:
    entry=venae cavae;
    exit=tricuspid valve;

VD cavity:
entry=tricuspid valve;
exit=pulmonary valve;
OG cavity:
entry=pulmonary veins;
exit=mitral valve;
VG cavity:
entry=mitral valve;
exit=aortic valve.

FIG. 2A represents a valvular plane 11 permitting the separation of zone 25 into a first zone 250 and a second zone 251. The second zone 251 communicates from a view point of the 3D image with a region corresponding to the pulmonary artery 13 that exits the right ventricle VD. The definition of the valvular plane 11 permits, from the view point of image processing, to dissociate the pulmonary artery 13 and the right ventricle VD by the generation of a flat border 11. From this fact, it becomes possible due to the definition of such a valvular plane to apply image processing of the volume 250 by analysis of the similarity of the pixel densities by considering a closed volume.

FIG. 1 represents a second valvular plane 12 that permits separating the right ventricle VD from the right auricle OD at the level of the tricuspid valve 16.

The definition of these valvular planes permits defining a closed 3D region for the processing of the images and the subsequent operations that will be achieved by the invention method.

In theory it is preferable to define as many valvular planes as orifices present in the considered cavity. However, the definition of a cavity can permit defining a border separating a cavity with several orifices if these latter are co-located in a nearby region. According to one variant of embodiment, a border 11 or 12 may be defined as a curved surface or a set of planes.

FIG. 2A represents a valvular plane 11 defining an upper boundary of the right ventricle VD. A second valvular plane such as the plane 12 may also be defined on this figure. An operator may also choose another cross-sectional image in which the orifices will be visible to define best the delimited region. Thus, every valvular plane may be defined on a same cross-sectional image or on different cross-sectional images of the acquired 3D image of the cavity.

This stage may be achieved by action of an operator 25 from a graphic tool palette in which the image is editable. The operator manually draws a feature, the feature represented on the screen generates a cross-sectional plane on the 3D image according to the axis not represented on the image.

Finally, according to one specific mode of embodiment, the invention method 30 permits generating a plane by default that may be validated or modified by an operator.

According to another mode of embodiment, when the anatomy of a cavity considered is known in advance, for example if it involves a human heart, then the valvular planes may be generated according to proportions of the heart image acquired and according to a detected orientation angle of the acquired image. A shape recognition method may be used in order to:
  automatically identify and locate the entries/exits of the cavity and;
  automatically generate some planes, where the orientation and the spatial position, permit separating the cavity considered from the entry(ies) and exit (s).

In all case of figures, a means of editing or modification of the valvular plane generated by default may be offered to an operator who may adjust its orientation and/or positioning.

When the cavity is the left ventricle VG, the right auricle OD or the left auricle OG, the invention method consists of a definition of at least one valvular plane permitting the closure of the cavity of an orifice.

The invention method includes a selection stage of a reference pixel density.

According to a first mode of embodiment, this stage preferentially consists of a selection of pixels from a cavity wall. In this case, the reference pixel density is calculated to define an upper limit of pixel densities of a defined region of interest in the wall.

According to a second mode of embodiment, the selection of a reference density may be chosen by a selection of pixels from the cavity. In this second mode, the reference pixel density defines a lower limit 25 of a pixel growth tolerance range as is detailed below.

According to a third embodiment mode, the reference pixel density is calculated between a range of pixel density values of the cavity and a range of pixel density values of the wall in order to discriminate the pixels from each of the regions.

Finally, according to a fourth embodiment mode, the selection of a reference density may be done by default according to the a priori knowledge of the respective densities of the cavity and the wall in a given population.

This pixel density defines a reference pixel density Dref. This stage is noted Dref on FIG. 5. The selection of a pixel reference density specifically permits parameterizing a subsequent stage of the process, specifically the growth stage.

According to the first mode of embodiment of the reference density selection, this stage of the invention method consists of the definition of a region of interest 22 drawn for example in the wall 21'. This wall is named a myocardial wall. The definition of a region of interest 22 permits measuring the mean and the standard deviation of the pixel densities of this region, is expressed in HU units, that is to say in Hounsfield units. The region of interest 22 consists of at least one pixel.

The objective of the definition of a region of interest 22 in the wall is to define a range of values of pixel densities where the reference pixel density Dref is calculated to define an upper limit of this range. The reference pixel density Dref acts as a reference in the step by step growth operation.

At the time of this growth operation every pixel density considered in the growth operation is compared to the reference pixel density.

The region of interest 22 can be defined on a 2D cross-sectional image or perhaps defined in 3D by means of the pixel density over a volume. According to one favored embodiment, the region of interest 22 is defined in the inter ventricular region separating the right ventricle VD from the left ventricle VG. The wall 21' offers a pixel density that permits defining a good reference subsequently to achieve a growth stage 25 without error in the delimitation of the extended zone. Another zone such as zone 20 or zone 21 can also act in an alternative manner to define a region of interest permitting the fixing of a reference density Dref.

This zone is suited particularly well to serve as reference for the determination of a pixels reference density Dref.

According to another mode of embodiment, it is possible to define a pixel reference density Dref not via a measurement on the image but according to an a priori knowledge of the wall density in a given population. In this case, a value 35 may be generated by default according to a predefined parameterization.

According to one mode of embodiment, an operator manually selects a region of interest 22, that is to say for example by means of a digital palette graphic tool or a mouse with regard to the image that is displayed on a screen. A region of interest 22 is thus defined on the FIG. 5 2A. The display of the region of interest 22 in real time permits providing a visual control to an operator specifically to avoid sampling pixels from the cavities 25 or 26 corresponding respectively to the right ventricle VD and to the left ventricle VG.

According to another mode of embodiment, a software processing of images allows shape recognition of a 2D or 3D image in order to recognize for example the right ventricle VD and the left ventricle VG in order to define a simple region of interest 22 in the wall 21'. A simple automatic generated shape may be a circle on the cross-sectional view or a sphere on the 3D image.

The invention method consists of a stage comprising the selection of at least one pixel 27 or a region 27 containing multiple pixels. This pixel or this region 27 defines a grain that will permit defining a zone that grows in the volume to lead to a 2D or 3D extended zone filling the cavity. The cavity 250 consists of a density of pixels greater than the density of the wall 21'. This difference in density is explained by the nature of the myocardium tissues and the blood circulating in the cavity 250.

In order to lead to a 2D or 3D region filling the cavity, the invention method 25 permits starting from a pixel or a region selected within the cavity to extend step by step into a zone enlarging according to a given criterion. This extension stage is noted EXT ZONE in the FIG. 5. One criterion may be to extend the region step by step to all pixels whose density is greater than the reference density Dref.

In the first mode of embodiment corresponding to the calculation of a reference density in the wall, a threshold density of 3 standard deviations above the mean measured in the wall may be chosen so that the region extends to the whole cavity but is limited to the internal side of the wall, that is to say the endocardium. The reference pixel density may be therefore chosen as the value corresponding to the threshold density of 3 standard deviations above the mean measured in the region of interest 22 of the wall 21'. In this case, the reference pixel density defines an upper limit of the range of pixel density values defined around an average density of a region of interest 22 of the wall.

The extension of the zone 27 may be made uniformly in all the directions 28 of the 3D volume or the 2D plane corresponding to the zone 250. The invention method permits achieving this extension stage of the zone 27 until a predefined density threshold is encountered. The threshold of pixel density is defined outside of the tolerance of pixel density that permits the step by step growth. When a pixel adjacent to the zone 27 consists of a density lower than the predefined pixel density threshold, that is to say the reference density, then the growth is halted and the pixel encountered is not incorporated into the growth zone 27. When the zone 27 grows as far as encountering pixels adjacent to a wall 20 or 21', the growth operation halts. From this fact, the growth of the zone 27 takes place as far as encountering the walls surrounding the cavity 250 that has a lower density than the density of the pixels of the cavity 25 or 250 and specifically lower than the reference pixel density defining the threshold density of predefined pixels.

According to the second mode of embodiment of the selection stage of the reference density Dref, the method includes a selection of a reference density Dref from the cavity 27 and a selection of a tolerance range of pixels growth.

According to this mode of embodiment, the step by step growth operation of the grain may be performed by comparing the densities of adjacent pixels and their adhesion to a predefined range of values called growth tolerance. This range of values is calculated from a measurement of the mean and the standard deviation of the densities within the cavity. A tolerance range may be calculated by a percentage of the average density of the region chosen at the start (for example +/−30% of the average), or in one mode of favored embodiment by deviation on the mean measured in standard deviations (for example mean+/−3 standard deviations). The density of the starting region within the cavity 27 is therefore used to define the tolerance range. By way of example, if the pixels density of the starting region is 275 and the standard deviation 25, the tolerance range value can be defined for example according to +/−3 standard deviations with respect to the mean, which allows defining a band of values of [200, 350]. If a neighboring pixel of the zone 27 does not belong to this band, then the growth 5 stops at this neighboring pixel in this propagation direction. When a reference density of Dref pixels is chosen within the cavity, only a minimal threshold may be chosen because the density values of the wall pixels are smaller than that of the cavity. So by resuming the previous example, a condition can be expressed in this manner: while the pixels density found in the step by step is greater than 200 HU, then the growth continues. The maximum limit 350 HU is optional.

Figure 2C:
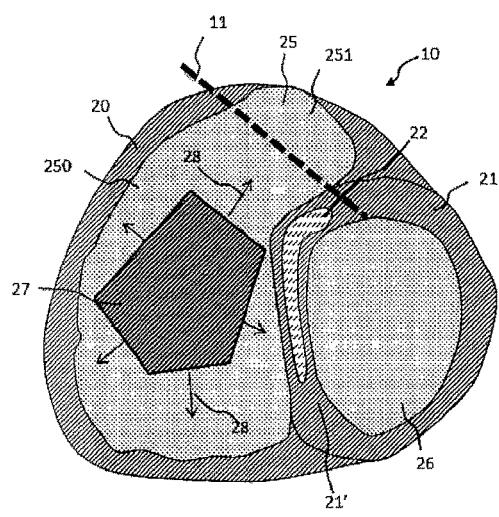
FIG. 2C: a growth zone according to the invention method in a 2D or 3D region of the image obtained of cardiac cavity here representing the right ventricle.

According to one mode of embodiment, the criteria may be to extend the region 27 to the pixels adjacent to the aforesaid region 27 if their density is included in an interval close to the density of the pixels of region 27. Thus the pixels of the grain may serve to calculate a reference pixels density. A tolerance threshold may be defined for the density analysis of a neighboring pixel in order to generate an extension step by step of the zone 27 such as represented in FIG. 2C. In this latter case, the second mode of embodiment allows calculating a reference pixel density of the cavity such as a lower limit of a selection of pixels of the grain when this latter represents a region of interest having more than one pixel. Thus, the reference pixel density allows defining the tolerance threshold.

The predefined threshold density may be fixed in a range of values corresponding to the minimal densities of pixels of the cavity 25. By way of example, it can involve a percentage of a documented mean density of a cavity. If the pixel density of the cavity is comprised between 200 and 400 HU, then a large threshold of 150 may be defined. By way of comparison, the pixels density of the myocardium of the acquired image, for example in the zone 21', is included between 20 and 100 HU. While using, an example of threshold of 150 HU, the zone 27 is going to extend as far as encountering the border of the wall 20, 21'.

When a contrast agent is used in blood circulating in the cavity 25, the density of the pixels of the image obtained of the cavity 25 or 250 can be heightened and therefore the reference density of Dref cavity may be raised, the range of associated growth tolerance values can also be raised in relation to the reference density value of the Dref cavity.

Figure 4A:
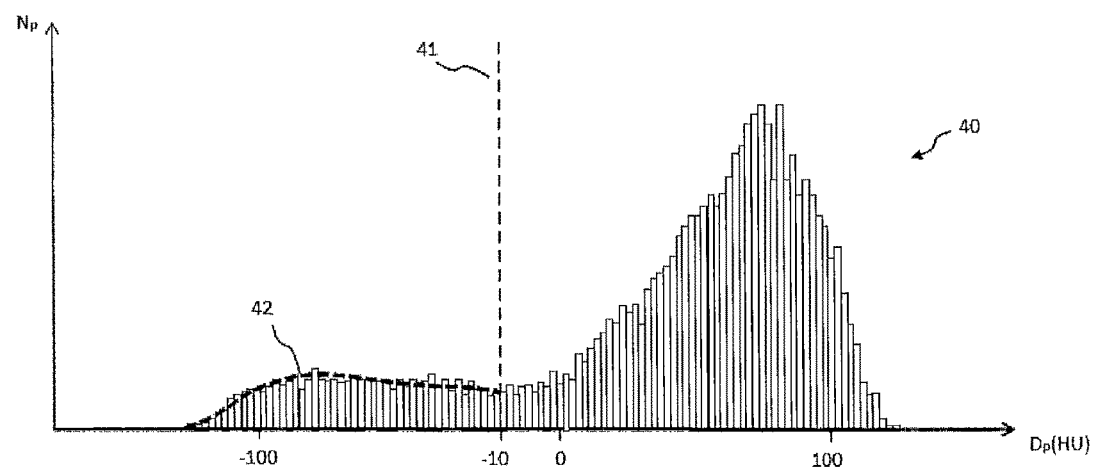
FIG. 4A: a thresholding on a histogram permitting to define the pixels of the image containing of the fibro-adipose tissue, and thus to quantify the fibro-adipose tissue content in the wall and in mapping the distribution according to the invention method.
Figure 4B:
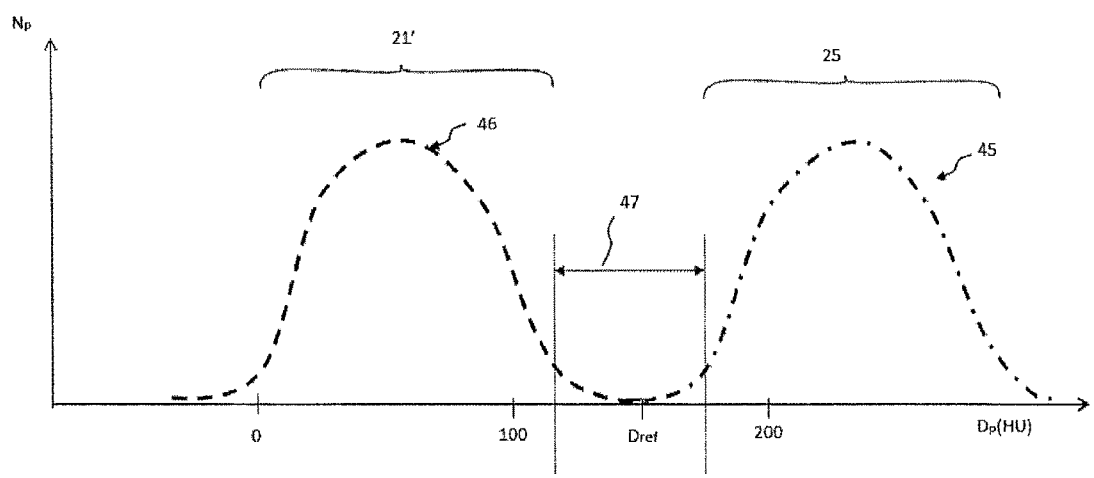

According to a third mode of embodiment that will be better understood on reading of FIG. 4B, the reference density Dref is calculated in order to offer a comparison value permitting to discriminate every pixel analyzed at the time of the growth operation with regard to two ranges of values associated respectively to the cavity and the wall. The FIG. 4B represents the distribution of pixel densities of 46 in the wall 21' and the distribution of pixel densities of 45 in the cavity 25. Each of distributions 45, 46, in this example, take the form of a Gaussian curve but which can be different according to the cases considered: patient profile, type of contrast agent, preprocessing of the acquired images, etc.

The two curves cross over in a zone 47 at which the definition of a pixels density of Dref permits discriminating each of the pixels from the two regions with the best precision.

This mode of embodiment corresponds to a combination of the first mode of embodiment and the second mode of embodiment.

According to the fourth mode of embodiment of the selection of a reference density Dref, the a priori knowledge of a relationship between the pixel densities of the cavity 25 and the wall 20 or 21' allows deducing a growth rule of region 27 according to the pixels density encountered step by step.

One advantage of the definition of at least one valvular plane that has been previously defined and drawn according to the invention method, is that it permits defining a border for halting the growth process of the zone 27 without that the density of the neighboring pixels encountered is lower than the predefined threshold. This border avoids that the growth process extends into the orifices such as the pulmonary artery 13 or the tricuspid valve 16. The extension zone 27 may marry the internal volume formed by the intersection of the cavity 25 and the volume delimited by the valvular plane 11 and containing the grain 27.

Figure 2D:
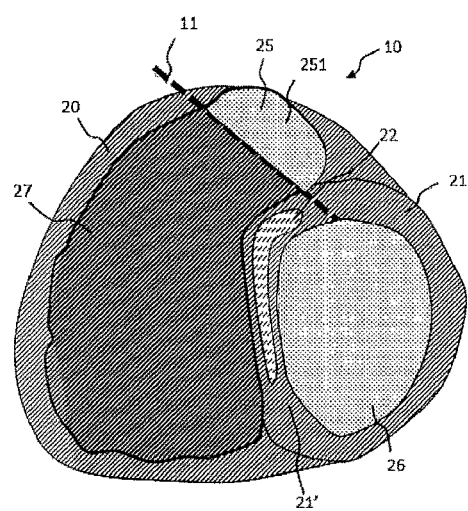
FIG. 2D: the generation of a 2D or 3D extended zone delimited specifically on the inside of the wall defining the cavity according to the invention method.

FIG. 2D represents such a volume generated from the growth of the zone 27. One advantage of the step by step growth between the pixels in observing an appreciably close density tolerance and the definition of a predefined threshold limiting the propagation of the growth is that the zone 27 stops sharply at the level of the internal tissue of the wall 20, 21', that is to say the endocardium. This operation permits delimiting the cavity 5 and the wall with a high precision considering the differences of pixels densities of these two 3D zones.

The final growth region is limited therefore to a cavity, and extends within this cavity until the internal wall (endocardium), and until the orifices. According to one mode of specific embodiment, the invention permits a quantification over several cavities or over the whole heart. The number of cavities explored will depend on the selection of the entry and exit valvular planes. Between these 2 planes 1 or several cavities may be analyzed.

Figure 3A:
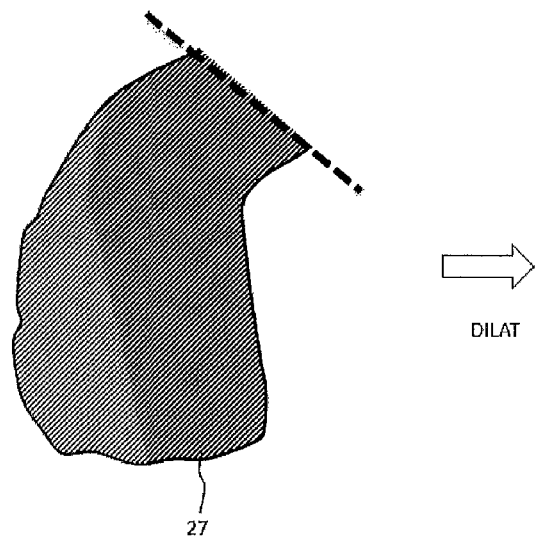
FIGS. 3A, 3B: a generation of an expanded 2D or 3D extended zone containing the cavity and the wall according to the invention method.

The invention method consists of a stage in which the extended 3D zone, noted as 27 in FIG. 3A, is expanded in its volume of a given proportion. This stage is noted as DILAT on the FIG. 5. The expansion of the zone 27 can be expressed as a percentage of the total volume or by an expansion distance noted as "d". The expansion distance 'd' corresponds to a same expansion distance 'd' of the volume in all directions 28 considering that the expansion is homogeneous over the whole surface of the volume 27 that is expanded. The expansion operation corresponds to a homothetic transformation of every cross-sectional plane of the surface 27. This expansion can take place in 2D, that is to say some volume cross-sections in the sense of the cross-sectional plane on each of the planes of 25, but the mode of favored embodiment consists in achieving this expansion in 3D, that is to say in the direction perpendicular to the surface of the extended 3D zone, noted as 27 in the FIG. 3A. This perpendicular direction to the surface of the 3D volume cannot be located in the plane of the cross-section.

According to one mode of embodiment, the zone 27 is expanded by an expansion distance of 1 to 12 mm. By way of example, a distance of 2 or 3 mm may be applied to the cavity delimited by the zone 27 when it involves the human right ventricle VD. This distance is especially suited to the wall delimiting the right ventricle VD since it corresponds to the minimal thickness of the wall among healthy subjects. One advantage of the suitability of the expansion distance 'd' value to the thickness of the wall is that only the wall volume may be treated subsequent to the processing stages. This thickness permits restricting the analysis to the wall contours therefore without the fat situated outside the wall surface is taken into account. It presents an important advantage when considering that the fatty masses situated outside of the wall can influence the quantification of the fatty masses inside the wall and that due to the invention method they are not considered. Nevertheless, it is possible to take in account the fatty masses external to the wall 20 in the subsequent stages of the processing, specifically on its external surface by choosing an expansion distance greater than 3 mm.

Figure 3B:
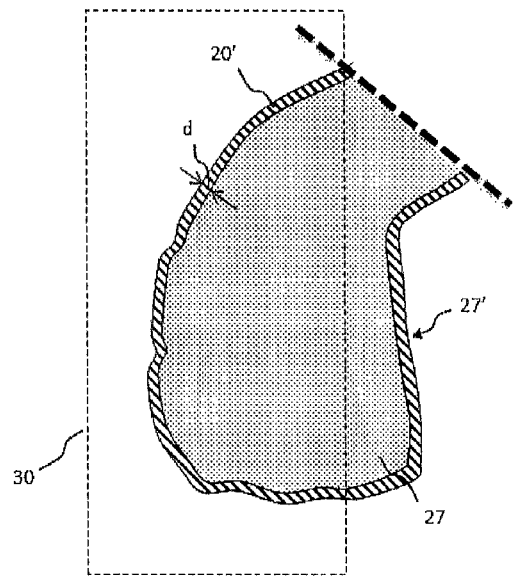

The volume 27 thus expanded ends in the definition of a volume 27' where the excess thickness 20' is represented in FIG. 3B. The volume 27' therefore includes, from the effect of expansion, the volume 27 and all or part of the wall 20 of the right ventricle VD.

According to the cavity considered, the expansion distance of the volume 3D obtained by the extension of the zone 27 may be adapted. By way of example, when the cavity is the left ventricle VG, the expansion distance d may be defined substantially close to 10 mm since the thickness of the wall of the left ventricle VG is roughly equal to this distance. According to another mode of embodiment, several successive expansions may be applied in order to explore the presence of fibro-adipose tissue within the different layers in the wall thickness.

The invention method consists of a stage aiming to extract the 3D volume corresponding to the excess thickness generated by the expansion operation. This stage is marked EXTRACT on FIG. 5. To achieve this stage, the process consists of the subtraction of the volume 27 from the expanded volume 27'.

Figure 3C:
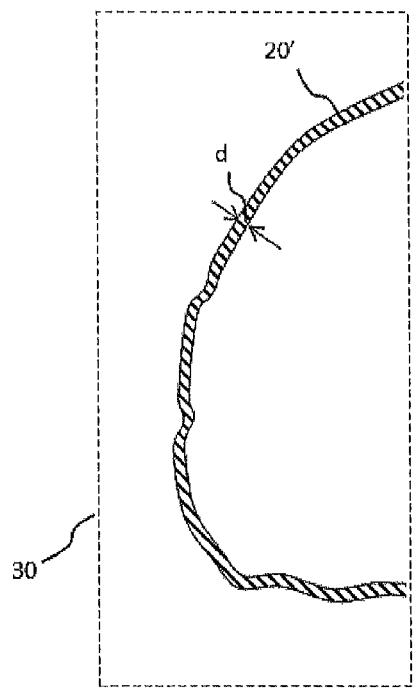
FIG. 3C: the generation of a 2D or 3D peripheral zone defining the analyzed wall, obtained by subtraction of the zone, defining the cavity according to the invention method.

FIG. 3C represents a cross-section view of the part 20' corresponding to the excess thickness of volume 27' obtained from the subtraction operation of the two previous volumes 27' and 27.

Besides, the invention method permits, in an optional manner, to define a zone of interest 30 permitting outlining that part of the 3D image obtained after expansion. This zone of interest 30 permits generating only a part of the volume amenable to be analyzed afterwards by the invention method. Typically, in the example of the expansion of the volume corresponding to a part of the right ventricle VD, the delimitation 30 5 permits extracting the excess thickness 20' corresponding to the outside border of the right ventricle VD and not to process the border between the right ventricle VD and the left ventricle VG.

The invention method then consists of a quantification stage of the pixel densities of the volumetric region 20'. This stage is marked QUANTIFICATION on FIG. 5. This stage consists of the reading the image 20', the processing of every pixel in this region and the recording of every pixel density. The pixels in a predefined value range can be counted in the volume extracted to stage 15 EXTRACT.

It is then possible to represent this quantification as a histogram 40, as represented in FIG. 4A. The representation as a histogram may be generated by the stage designated as HIST in FIG. 5. As ordinate of this histogram the number of pixels are displayed, noted Np, as well as the pixel density, noted as DP(HU), represented on the abscissa. The pixel density unit is the Hounsfield unit HU.

On reading the histogram 40, it is possible to count the number of pixels included for example between −30 and −10 UH and to deduct some 25 of them from a presence of such pixels in the wall of the right ventricle. For the purpose of a better interpretation of FIG. 4, the limit 41 is represented in order to identify the proportion of pixels whose density is less than −10 UH. The upper limit of the histogram for the pixels of density less than −10 is represented by the curve 42. According to one mode of embodiment 30, the quantification takes into account all pixels less than a threshold, for example −10 UH on the example given in FIG. 4. According to another mode of embodiment, several thresholds may be applied in order to quantify several fatty masses of different densities, for example from −150 to −50 HU, and from −50 HU to −10 HU.

According to one mode of embodiment, the invention method consists of a mapping stage permitting the representation in superposition of the cavity considered, the excess thickness 20' with a given colormetric coding. This stage is represented by the CARTO block on FIG. 5. The stage 5 mapping permits displaying the pixels distribution corresponding for example to fatty masses. Since every pixel consists of a 3D position in the image and a pixel density. The assignment of a pixel color is achieved from the time its density is included in an interval of given values, for example [−10, −30].

The volume 20', thus generated and represented on a display such as a computer screen, may be visualized by an operator. Means of steering the position and the orientation of the image 20' may be used in order to perform some rotations in the volume space 20' to study the surface and the presence of fats in the myocardial wall. The image generated in 3D may be incorporated into a display platform to provide a surgeon or cardiologist when operating the means to guide a heart operation. FIG. 5 represents the different stages of the invention process. It is specified that the stages PLAN VALV and the Dref stages are not executed in a predetermined sequence since they require manual interventions by an operator. This operator may first define the valvular planes indifferently or first choose the reference density.

According to one variant of the invention method, the expansion operation may be done step by step by expansion of a pixel from the entire extended volume 27. The volume 27 may then be subtracted from the expanded volume 27' to obtain a layer the width of one pixel to which a mapping may be applied. The operation may be iterated step by step over multiple layers that when superimposed correspond to an excess thickness of a desired distance, for example 3 mm.

This process permits representing every layer with its own colormetric coding that permits a 3D display with great reading precision specifically on the penetration level of the fat in the thickness of the myocardial wall.

According to another variant of the invention method, a colormetric coding 5 may be defined for segments of pixel density in a predefined band of values. For example, while considering a band of pixel density values presenting an interest between −10 and −50 HU, 4 segments may be defined by the following ranges: [−10,−20], [−20,−30], [−30,−40], [−40,−50]. Every segment may consist of an assigned colormetric coding in order to represent the density variations in the representation of the volume 20' displayed.

The invention method may optionally consist of a stage prior to the acquisition of 3D images that consist of the diffusion of a contrast agent in the cavity. This contrast agent permits obtaining pixel densities from the different parts of the very different heart, which improves the contrast for example between a zone corresponding to the cavity considered and a zone corresponding to the myocardium. The contrast agent can be for example an iodized water-soluble agent. It may be injected by via venous or arterial means or by perfusion when the heart is explanted.

The invention method is achieved for example by means of a computer that is configured to acquire an image from a scanner. A software 25 permitting the image representation on the screen may be used. The processing stages may be executed by a software component especially designed for this purpose and that is implemented in an existing software or in a software dedicated to this processing. The computer cpu, or any calculator, may be used in order to perform all the images processing stages, namely specifically the operations of zone extension, expansion and extraction of a 3D volume peripheral to the volume 20'.

According to a first mode of embodiment, the process applies on heart images of a man or a woman, the scanner being achieved in the region of the body concerned.

According to another mode of embodiment, the process applies on images acquired from an animal heart.

According to another mode of embodiment, the process applies for example on an isolated heart explanted from of the human body. It may be for example perfused.

The invention method can be used for the diagnosis of right ventricle arrhythmogenic dysplasia, a pathology of the myocardium responsible for a fatty infiltration of the wall.

The method can also be used among the patients where the diagnosis of arrhythmogenic dysplasia is already known, not to establish the diagnosis, but rather to quantify the extent of the illness to evaluate a prognosis, as for example the risk of arrhythmia or cardiac insufficiency. Such a quantification may be applied in a repeated manner on the same patient in order to follow the spontaneous evolution of the illness, or to track the effect of a possible treatment.

The method may also be used to detect and quantify the sequellae of coronary thrombosis, that are also associated with a reduction of the muscle density on the scanner images obtained. Besides the detection of the thrombosis sequellae, the quantification could be used in order to value a pejorative prognosis linked to the size of the infarct, such as the risk of the development of an arrhythmia or a cardiac insufficiency.

Finally, the method could also apply to the detection and the quantification of the fat within the wall of the auricles. The method 25 could also find diagnostic and prognostic applications there, in particular among the patients suffering atrial arrhythmia such as auricular fibrillation.

In addition to the detection and quantification of fats, and its applications to the diagnosis and prognosis of pathologies, the method 30 of the invention permits a 3D mapping of the fatty regions within the heart. It can be applied therefore to therapeutic guidance, in particular in the domains of ablation and cardiac stimulation. It is possible today to place spatially the probes and intra-cardiac catheters during interventions, and the integration of 3D data within these localization systems has already been shown feasible and useful for assisting the intra-cardiac navigation and the targeting of therapies. The possibility to display the fatty zones within the cardiac muscle can therefore permit guiding the ablation and stimulation procedures. The pathologies concerned are the disorders of heart beat and conduction among the patients suffering right ventricle arrhythmogenic dysplasia, among the patients presenting some myocardial scars (infarctus, myocarditis, surgical scars), or among patients suffering auricular fibrillation.

The invention claimed is:

1. A method for quantification of the presence of fats in a region of the heart, the method comprising:

acquiring a three-dimensional (3D) image of at least one cavity of the heart and of a wall delimiting the cavity;

selecting at least one pixel of the cavity defining a grain;

performing a growth of the grain step by step as far as meeting a pixels density zone lower than a predefined threshold, the growth of the grain ending in a definition of a delimited extended zone where the density of pixels is included in a first range of values, a 3D image obtained by growth corresponding to a 3D extended zone;

performing an expansion operation of the 3D extended zone permitting to define an expanded volume containing at least a part of the wall thickness of the cavity considered;

performing an extraction operation of a peripheral region coming from a subtraction of the volume of the 3D extended zone to the expanded volume and;

quantifying the number of pixels of a second range of values of the extracted peripheral region.

2. The method for quantification of presence of fats according to claim 1, wherein the acquisition of a three-dimensional image of the heart is achieved by a scanner, the density of the pixels of the image being expressed in the Hounsfield unit.

3. The method for quantification of presence of fats according to claim 1, further comprising:

defining at least one border of the three-dimensional image of the heart cavity considered;

the growth of the grain taking place as far as meeting at least a border or a pixel density zone lower than the predefined threshold.

4. The method for quantification of presence of fats according to claim 3, wherein the border permits separating the part of the image acquired containing the cavity considered from an orifice entering into the aforesaid cavity where the pixel density is included in the first range of values.

5. The method for quantification of presence of fats according to claim 1, wherein the growth of the grain takes place in three dimensions from a selection of pixels on a cross-sectional plane of the cavity.

6. The method for quantification of presence of fats according to claim 1, wherein the growth of the grain takes place in two dimensions on every cross-sectional plane of the cavity, the 3D extended zone being reconstituted by the set of 2D extended zones.

7. The method for quantification of presence of fats according to claim 1, wherein the predefined threshold is defined with regard to a determination of a pixel reference density calculated from a measurement in the acquired image, the aforesaid image acquired containing the cavity and at least one of the walls of the aforesaid cavity.

8. The method for quantification of presence of fats according to the claim 7, wherein the reference density is calculated from a measurement made on pixels of the cavity, the reference density corresponding to a lower limit of the first range of pixels density values.

9. The method for quantification of presence of fats according to the claim 7, wherein the pixel reference density is calculated from a measurement performed on wall pixels defining a region of interest, the reference density corresponding to an upper limit of a third range of values of pixel densities from the region of interest.

10. The method for quantification of presence of fats according to the claim 9, wherein the reference pixel density is calculated in a band of values situated between the first range of values and the third range of values in order to best discriminate the allocation of a pixel to one of these ranges of values.

11. The method for quantification of presence of fats according to the claim 7, wherein the measure of the reference density is chosen among a predefined value corresponding to a typical heart profile.

12. The method for quantification of presence of fats according to claim 1, wherein the expansion operation is iterated multiple times in order to generate multiple 3D expanded images, the successive expansions being determined so that every new 3D expanded image contains the previous 3D expanded image.

13. The method for quantification of presence of fats according to claim 12, wherein a 3D layer of a peripheral region of the 3D image extent is extracted by subtraction of a N−1 th expanded image of the 3D extended image to the expanded image of the 3D extended image.

14. The method for quantification of presence of fats according to claim 1, wherein an operation of quantification includes the enumeration of the number of pixels of a density included in the second range of values in a 3D extracted layer or a 3D peripheral region.

15. The method for quantification of presence of fats according to claim 14, wherein an operation of thresholding of the pixels densities of the 3 D region peripheral includes a distribution according to a multitude of ranges of values of different pixel density proportions.

16. The method for quantification of presence of fats according to claim 14, wherein a 3D mapping generation of a cavity wall includes a representation of the pixel density included in the second range of values with a predefined colormetric coding.

17. The method for quantification of presence of fats according to claim 15, wherein a 3D mapping generation of the cavity wall includes a subdivision of the second range of values in a multitude of sub-ranges of values correspondent to different proportions of pixel densities with a predefined colorimetric coding assigned to every subdivision.

18. A system for the display of an imaging of an organ permitting the visualization of fatty masses, implementing a method for quantification of fat presence, the system comprising:

a display configured:
to visualize a cross-section of a three-dimensional (3D) image acquired by a scanner;
to visualize a three-dimensional image where the mapping is to be generated by the method;

a selector:
of at least one pixel to define a reference density and;
of at least one pixel to generate a 3D extended zone obtained by step by step growth;

a tool configured to draw a line defining at least one valvular plane;

an interface configured:
to parameterize an expansion distance or an expansion proportion;
to extract a three-dimensional excess thickness from the volume coming out of the 3D extended zone and 3D expanded zone;

a calculator configured:
- to count a number of pixels of the three-dimensional excess thickness having a density included in one interval of predefined value;
- to achieve all calculations permitting to process the operations on the 3D images among which specifically the operations of expansion, of extension, of extraction, wherein the calculator is configured to perform an extraction operation of a peripheral region coming from a subtraction of the volume of the 3 D extended zone to the 3D expanded volume and to quantify the number of pixels of a second range of values of the extracted peripheral region.

* * * * *